July 30, 1968

A. J. MILLER ET AL 3,395,054

SELF-SIZING THERMOCHEMICAL SCARFING

Original Filed Feb. 3, 1965

INVENTORS
A. J. MILLER
R. F. HINSCHLAGER
S. ALLAN
W. C. WEIDNER

BY Leo A. Plum, Jr.
ATTORNEY

July 30, 1968

A. J. MILLER ET AL 3,395,054

SELF-SIZING THERMOCHEMICAL SCARFING

Original Filed Feb. 3, 1965

INVENTORS
A.J. MILLER
R.F. HINSCHLAGER
S. ALLAN
W.C. WEIDNER

BY Leo A. Plum, Jr.

ATTORNEY

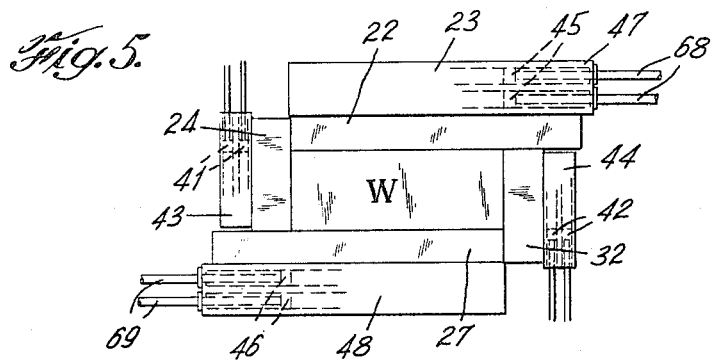
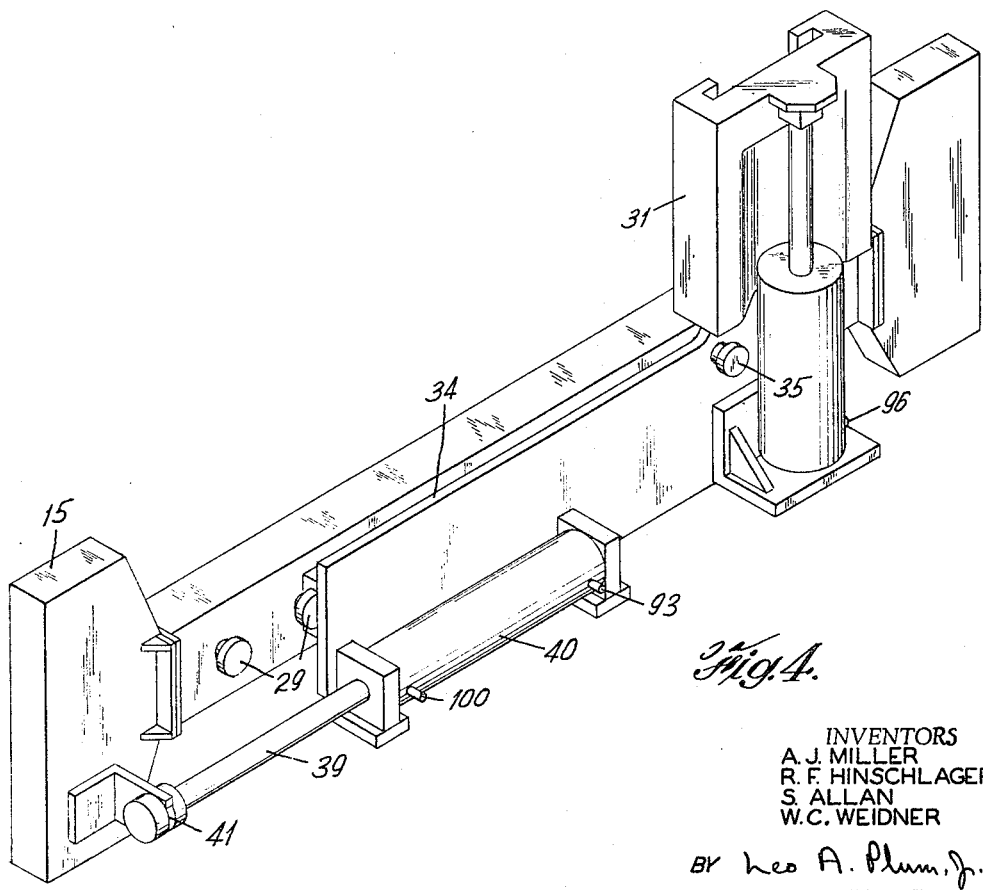

United States Patent Office 3,395,054
Patented July 30, 1968

3,395,054
SELF-SIZING THERMOCHEMICAL SCARFING
Alfred J. Miller, Westfield, Rudolph F. Hinschlager, West Orange, Stewart Allan, Livingston, and William C. Weidner, Summit, N.J., assignors to Union Carbide Corporation, a corporation of New York
Continuation of application Ser. No. 430,096, Feb. 3, 1965. This application Aug. 30, 1967, Ser. No. 664,570
6 Claims. (Cl. 148—9.5)

ABSTRACT OF THE DISCLOSURE

A method of thermochemical scarfing with normal self-sizing steps, but wherein the improvement comprises locking the scarfing units after the initial sizing has been completed but before the scarfing reaction has been initiated and then retracting all of the scarfing units a pre-set distance and maintaining them in this retracted position while reversing the direction of the workpiece to enable the making of an end start, and thereafter moving the units back into riding contact with the workpiece for scarfing the remainder of its length.

---

This application is a continuation of application Ser. No. 430,096, filed Feb. 3, 1965, now abandoned.

This invention relates to the thermochemical scarfing of ferrous metal bodies, and more particularly to an improved apparatus which is automatically adjustable to suit any size rectangular section to be scarfed. The invention also relates to an improved method and apparatus for scarfing the entire length of a workpiece. So long as the overall size of the metal body is smaller than the maximum size which the machine is designed to process, the actual cross sectional dimensions of the particular metal body to be scarfed need not be known by the scarfing machine operator.

During the production of steel slabs in a rolling mill it is customary to condition the surfaces thereof at an intermediate stage of the rolling steps. The purpose of such conditioning is to eliminate surface defects such as cracks, seams and slag inclusions that would produce defects in the finished products, if not removed. It has been found economical to eliminate such defects by thermochemically removing an entire surface layer of one or more longitudinal surfaces of the slab to be conditioned by the use of a suitable machine preferably interposed in the mill conveyor line between roll stands. In this way, the steel slabs may be conditioned while hot and without interrupting continuous production of steel.

In many instances, the steel mill does not roll merely one sized slab and often, many different sizes are rolled in the same mill; it is common practice to change sizes between alternate slabs in some mills. It is therefore desired to provide a scarfing machine which will be automatically self-adjusting to accommodate successively different sizes of slabs even though the exact dimensions of such slabs are not known to the scarfing machine operator when it enters the machine. Almost all of the prior art scarfing machines must be pre-adjusted so that a predetermined size opening corresponding to the dimensions of the workpiece will be provided. To accomplish this the operator must know the exact dimensions of the workpiece ahead of time so that he can preadjust the machine. Thereafter, the workpiece is directed through the preadjusted opening and the scarfing process cycle is initiated.

This mode of operation has a number of obvious disadvantages which would not be present if the machine was entirely automatically self-adjusting. For example, when the mill is operating at high production rates, the time required for preadjusting the machine creates a significant bottleneck in the overall operation. Moreover, the increased number of machine adjustments in such case often causes the operator to adjust the machine incorrectly. Sometimes these errors are the result of incorrect information received by the operator as to slab size from the rolling mill schedule or from mill operators. In any case, errors in pre-adjusting the machine to an incorrect size can result in damage to the scarfing units, in a poorly scarfed product, or in safety hazards because of improper adjustment of the gas selector valves in each scarfing unit.

In copending application Ser. No. 180,785 filed by S. Allan et al. on Mar. 19, 1962, now abandoned, a scarfing machine is disclosed and claimed which is entirely self-adjusting. It does not require the operator to pre-adjust the machine ahead of time, and therefore, the exact size of the workpiece to be scarfed need not be known. Such machine is particularly well suited for the scarfing of billets and blooms. Instead of requiring preadjustment, the workpiece is fed into the mouth of the machine and the master-switch is closed. The machine allows the scarfing units to close from their wide-open retracted position, until each unit comes into contact with a side of the workpiece. At this point the gas selector valves in each unit have been adjusted to conform to the dimensions of the workpiece, in response to the closing movements of the scarfing units, and the scarfing process begins.

While this machine is well suited for scarfing billets and blooms, it presents a number of obstacles which make its use undesirable for scarfing the full range of slab cross sections normally encountered in a mill. For example, the scarfing of large width slab sections with a machine of the above-mentoined type would necessitate the use of correspondingly larger and substantially heavier sizing equipment. This in turn would make it exceedingly difficult to accurately control the movement and alignment of this equipment solely by means of large air cylinders, as used on this machine. It would also be difficult because of the great weight involved to prevent each horizontal scarfing unit from becoming out of line from its correct position parallel at all times to the surface to be scarfed.

Moreover, the predetermined necessary pressures applied to each air cylinder to move the scarfing units during sizing would have to be changed due to dirt entering the cylinders and resulting in malfunctioning of the system. Dirt can effect the system substantially because of the lack of a positive mechanism tying in the movement of one scarfing unit with that of another.

Another factor which would tend to make such a machine impractical for scarfing large slab sections is the size of the gas selector valve push rods which would be required for adjusting the gas passage operating width of the upper and lower scarfing units. In the Allan et al. apparatus, the gas selector mechanism associated with the upper and lower scarfing units is operated by an arm which is fastened to the mounting plate carrying each of the side scarfing units. It would not be uncommon for a mill to process slabs having a width of seven feet or more. In such case, the upper and lower scarfing units would have to be at least seven feet long. Since the pusher arms must be large enough to move the gas selector mechanism associated with each of these units from a fully open position to a fully closed off position, it would require a pusher arm on the order of fourteen feet in length. This would make the apparatus awkward and impractical and would create numerous difficulties in adequately supportably moving each of these pusher arms in addition to requiring addition floor space in the mill.

Prior art scarfing machines, including the Allan et al. self-sizing apparatus abovementioned, are not capable of desurfacing the entire length of a workpiece. The main reason for this is that the scarfing units must be maintained in a floating position during scarfing in order to yield to surface irregularities and camber in the workpiece. However, correct positioning of the scarfing units in order to start the reaction on the leading corners of the workpiece is critical and cannot be achieved on a commercial production basis with floating scarfing units. The problem becomes further magnified with self-sizing apparatus, such as that of the Allan et al. type referred to previously. In a self-sizing machine, the scarfing units will continue to close from their retracted position until they are stopped by contacting the surfaces of the workpiece. This then necessarily requires that the workpiece be in the machine during the sizing steps of the scarfing cycle. In this position, it is not possible to direct the scarfing process gases against the leading corners of the workpiece. If after the sizing step, the workpiece was backed out of the machine, the scarfing units would continue to move together toward a completely closed position. On the other hand, if a slight pressure were applied to the air cylinders controlling the scarfing unit movement so as to prevent the units from further closing, it would allow the units to move toward a fully retracted position, and therefore also defeat the previous sizing step.

It is an object of the invention to provide an improved scarfing apparatus which is automatically self-adjusting about successive workpieces, even though the exact dimensions of such workpieces are not known to the operator.

Another object is to provide a scarfing machine of the self-sizing type which is particularly well suited for scarfing a full size range of ferrous metal slabs.

A further object is to provide a novel method and apparatus for scarfing the entire length of a ferrous metal workpiece.

A still further object is to provide a method and apparatus for automatically adjusting a scarfing machine to handle successive metal bodies of unknown cross sectional dimension and yet scarf the entire length thereof.

Other objects and advantages which are inherent in the present invention will become apparent from the following specification and drawings, and from the appended claims.

In the drawings:

FIG. 4 is an isometric view illustrating a horiozntal slide assembly and a vertical slide assembly slidably mounted upon the lower float member of the machine shown in FIGS. 1–3, certain parts having been deleted for clarity.

FIG. 5 is a partial front elevational view showing the scarfing units illustrated in FIG. 1 in their final sizing position, fully closed around the workpiece

Figure 1:
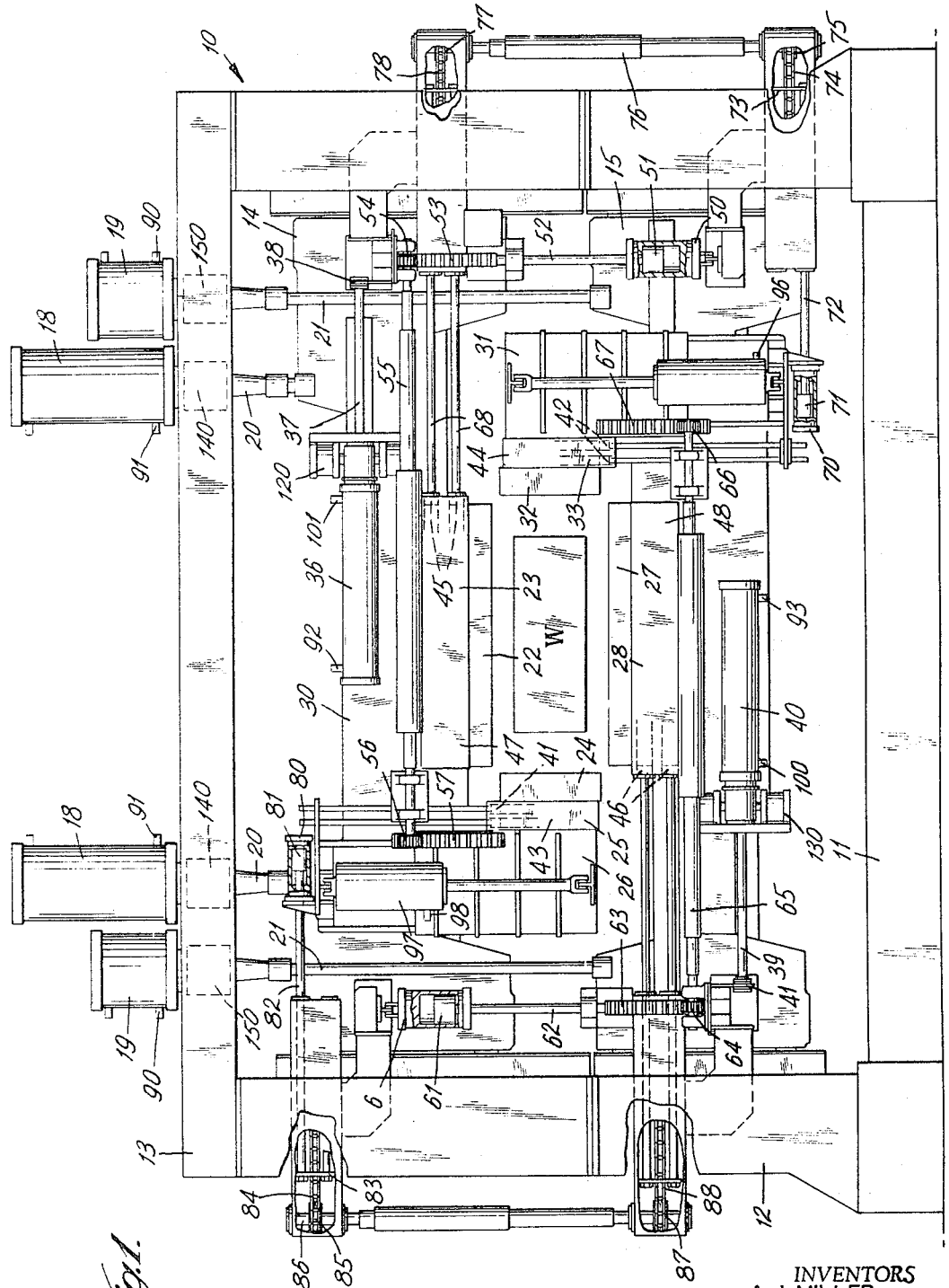
FIG. 1 is a front elevational view of a scarfing machine according to the invention and showing the scarfing units in their fully retracted position at the beginning of the scarfing cycle.

According to the main embodiment of the invention, a scarfing apparatus is provided which is automatically self-adjusting so that successive metal bodies having different cross sectional dimensions may be quickly scarfed although the exact dimensions of each are unknown to the scarfing machine operator. The apparatus consists of a main frame supporting upper, lower, right side and left side scarfing units, each of such units adapted to scarf a corresponding side of the metal body. Each scarfing unit has a gas selector valve assembly associated with it for opening and closing off gas ports along its working surface, so that the width of the gas stream issuing therefrom during scarfing substantaily corresponds with the surface of the metal body to be scarfed thereby. Means are provided for moving each scarfing unit from its initially retracted position, into riding contact with the metal body to be scarfed. Means are also provided for simultaneously adjusting the selector valves in synchronized response to the movement of the scarfing units. More specifically, the selector valve associated with the left side scarfing unit is progressively closed off in synchronized response to upward movement of the bottom scarfing unit into contact with the bottom surface of the metal body. Similarly, means are provided for adjusting the selector valve associated with the right side scarfing unit in synchronized response to the movement of the top scarfing unit so as to progressively close off gas ports in the right side unit as the top unit moves downwardly into contact with the top surface of the metal body. Means are also provided for adjusting the selector valve associated with the top scarfing unit in synchronized response to movement of the left side unit such that gas ports in the top unit will be progressively closed off as the left side unit moves into contact with the left side of the metal body. Similarly, means are provided for adjusting the selector valve associated with the bottom scarfing unit in synchronized response to movement of the right side scarfing unit, such that gas ports in the bottom scarfing unit will be progressively closed off as the right side unit moves into contact with the right side of the metal body.

The scarfing units are supported by the machine framework but are movable vertically with respect thereto. The upper and left side scarfing units are mounted upon an upper float member. The lower and right side units are mounted upon a lower float member. Each float member is in turn supported by and vertically movable within the main frame. The upper and left side scarfing units are mounted on the upper float member in such manner that they are slidable thereon in unison in a horizontal direction, while the left side unit is capable of moving vertically independently of such upper unit. Similarly, the bottom and right side units are mounted so as to be slidably in unison on the lower float member in a horizontal direction, but so that the right side unit may move vertically independently of bottom unit. The left side scarfing unit is interconnected by gearing means to the lower float member, so that vertical movement of the bottom scarfing unit produces a corresponding vertical movement in the same direction of the left side scarfing unit. The right side scarfing unit is interconnected by gearing means to the upper float member, so that vertical movement of the top scarfing unit produces a corresponding vertical movement in the same direction of the right side scarfing unit. Finally, means are provided for vertically raising and lowering of the float members and for horizontally sliding the top and left side units and the bottom and right side units, respectively, in unison.

A novel method and apparatus is described for scarfing the entire length of a metal body. This method and apparatus may be employed advantageously with scarfing machines of the automatically self-sizing types. The method briefly consists of locking the scarfing units in place after they have initially self-adjusted themselves in riding contact about the metal body so that the units cannot continue to move toward a completely closed position when the workpiece is backed out of the machine. Thereafter the workpiece is backed out of the machine to a position wherein the preheating gases and scarfing oxygen streams, when turned on, will strike the surfaces to be scarfed immediately adjacent the forward end of the workpiece. The preheat gases are then turned on and directed at the workpiece until a thermochemical reaction is initiated on the surfaces thereof. Thereafter a sheet-like stream of oxygen is directed against each preheated surface while the workpiece is moved toward the scarfing units at a normal scarfing speed. As soon as the workpiece again enters the machine opening defined by the four scarfing units, the units are disengaged from their locked position so that they will scarf the remainder of the workpiece in riding contact therewith.

Preferably the scarfing units are retracted a pre-set distance and again locked to prevent further retraction, prior to the preheating step. This is desirable since it provides sufficient clearance for the metal body to easily enter the machine opening without damaging the scarfing units if for example, the metal body had a fin extending from its forward end.

Figure 2:
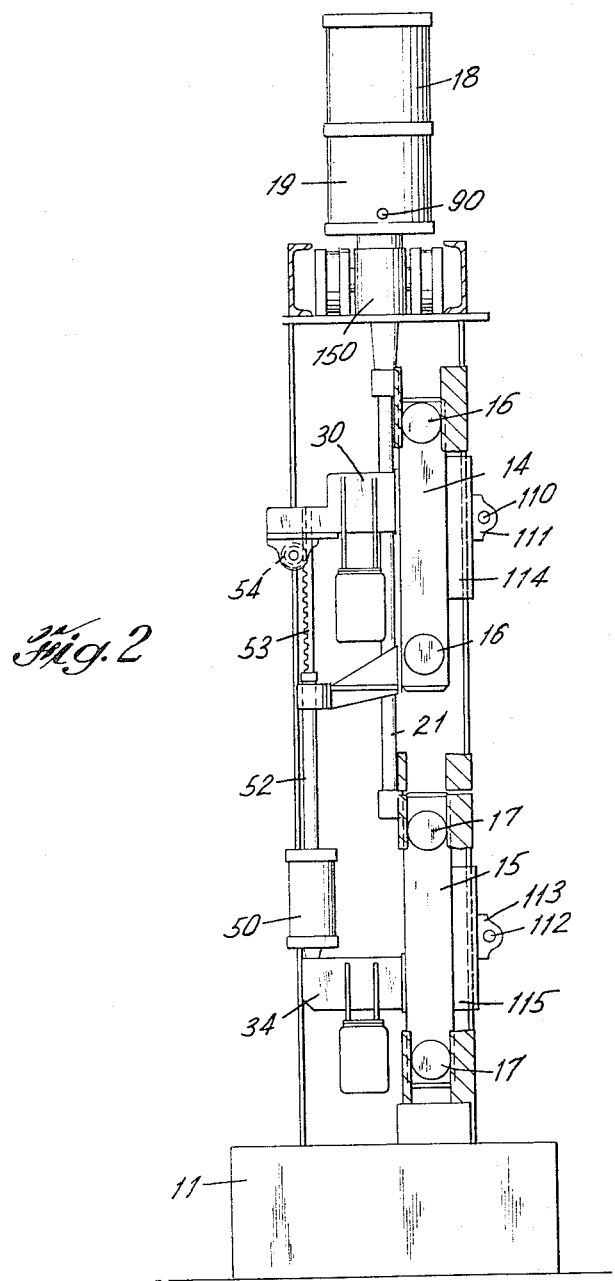
FIG. 2 is a side elevational view, partly in section, taken along the lines 2—2 of FIG. 1.

Referring now to FIGS. 1 and 2 of the drawings, the scarfing apparatus consists of a main frame 10 having lower cross member 11, support columns 12 and upper cross member 13. The frame 10 supports an upper float member 14 and a lower float member 15, each of which may move vertically within columns 12 on guide rollers 16 and 17 respectively. Vertical movement of float members 14 and 15 is provided by air cylinders 18 and 19 respectively which are mounted upon the upper cross member 13 and have their respective pistons 20 and 21 fixedly connected to the float members 14 and 15 respectively.

A top scarfing unit 22 having a gas selector valve assembly 23 associated therewith, and a left side scarfing unit 24 having gas selector valve assembly 25 associated therewith, are indirectly mounted upon the upper float member 14 in such manner that they will slide horizontally in unison thereon but wherein the left side scarfing unit 24 may move in a vertical direction independently of the top scarfing unit 22. This is accomplished by fixedly mounting top scarfing unit 22 with its associated selector valve assembly 23 upon a horizontal slide plate 30 which is in turn slidably mounted upon upper float member 14 such that the entire horizontal slide plate 30 is movable is a horizontal direction upon upper float member 14. The left side scarfing unit 24 with its associated selector valve assembly 25 is fixedly mounted upon a vertical slide plate 26 which is in turn slidably mounted upon the horizontal slide plate 30. Thus, the left side scarfing unit 24 may move vertically independently of the top scarfing unit 22, but will move horizontally in unison therewith as the horizontal slide plate 30 is moved in a horizontal direction on upper float member 14.

In the same manner, the bottom scarfing unit 27 with its associated gas selector valve assembly 28 and vertical slide plate 31, carrying right side scarfing unit 32 and gas selector valve assembly 33, are mounted upon horizontal slide plate 34 which in turn is slidably mounted upon the lower float member 15. As shown more clearly in FIG. 4, the horizontal slide plate 34 will be able to move horizontally across the lower float member 15 on cam followers 29 attached thereto, while the vertical slide plate 31 may move in a vertical direction over the horizontal slide plate 34 on cam followers 35 attached thereto. Thus the bottom and right side scarfing units will move in unison in a horizontal direction, while the right side scarfing unit can move in a vertical direction independently of such bottom scarfing unit.

The entire horizontal slide plate 30 is movable in a horizontal direction by air cylinder 36 mounted thereon with its piston rod 37 fixedly connected at 38 to upper float member 14. Similarly, the entire horizontal slide plate 34 is movable in a horizontal direction, opposite to the movement of plate 30, by air cylinder 40 mounted thereon with its piston rod 39 fixedly connected at 41 to lower float member 15.

Figure 3:
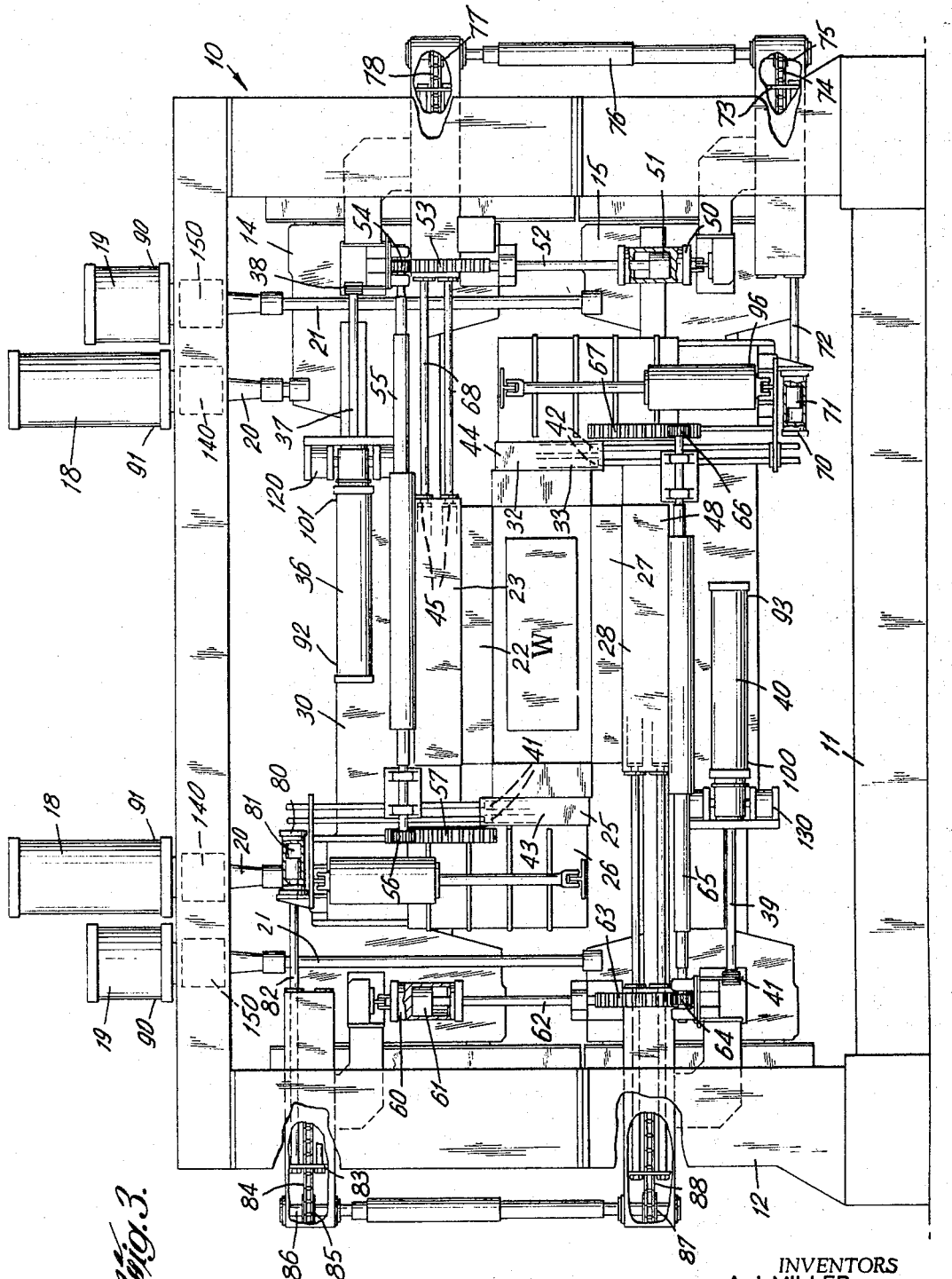
FIG. 3 is a front elevational view of the scarfing machine shown in FIG. 1, but wherein the scarfing units have moved from their fully retracted position to a position for scarfing the maximum size slab section which the machine can handle.

As shown in FIGS. 1, 3 and 5, the gas selector valve assembly associated with the left side and right side scarfing units consists of fixed pistons 41 and 42 respectively which open up and close off the gas ports to each of the scarfing units as the manifolds 43 and 44 respectively move vertically with each of their associated scarfing units. The selector valve assemblies are preferably of the hollow piston type disclosed in U.S.P. 3,016,947, issued Jan. 16, 1962 in the name of S. Allan.

The gas selector valve assemblies 28 and 23 which are associated with the top scarfing unit 22 and bottom scarfing unit 27 respectively are also preferably of the type disclosed by S. Allan in U.S.P. 3,016,947 but wherein the pistons 45 and 46 therewith respectively are movable relative to each manifold 47 and 48 respectively, to open up and close off the gas porting to each scarfing unit associated therewith.

Vertical movement of the bottom scarfing unit 72 produces a corresponding vertical movement in the same direction of the left side scarfing unit 24 through gearing means interconnecting the left side scarfing unit with the lower float member 15, upon which the bottom scarfing unit is mounted. The gearing means consists of sizing cylinder 50 containing piston 51, piston rod 52 attached at one end to piston 51, rack 53 attached to the opposite end of piston rod 51, gear 54 movable in mesh with the teeth of rack 53, telescoping spline shaft 55 connected at one end to gear 54 and at the opposite end to gear 56, and rack 57 movable in mesh with the teeth of gear 56. The rack 57 is fixedly mounted to vertical slide 26 which carries the left side scarfing unit 24. Through this gearing movement of the bottom scarfing unit in a vertical direction is transmitted to the left side scarfing unit causing it to move vertically in the same direction.

As the left side unit moves vertically upward in synchronized response to upward movement of the bottom scarfing unit, it produces a corresponding closing off of gas porting by the manifold 43 moving over the fixed pistons 41 therein.

Similarly, vertical movement of the top scarfing unit 22 produces a corresponding vertical movement in the same direction of the right side scarfing unit 32, through gearing means interconnecting the right side scarfing unit 32 with the upper float member 14, upon which the top scarfing unit is mounted. The gearing means similarly consist of sizing cylinder 60 containing piston 61, piston rod 62 attached at one end to piston rod 61, rack 63 attached to the opposite end of piston rod 61, gear 64 movable in mesh with the teeth or rack 63, telescoping spline shaft 65 connected at one end to gear 64 and at the opposite end to gear 66, and rack 67, movable in mesh with the teeth of gear 66. The rack 67 is fixedly mounted to vertical slide 31 which carries the right side scarfing unit 32. Through this gearing, the movement of the top scarfing unit is transmitted to the right side scarfing unit, causing it to move vertically in the same direction, in synchronized response to the movement of such top scarfing unit.

As the right side scarfing unit moves vertically downward in response to downward movement of the top scarfing unit, it produces a corresponding closing off of gas porting thereto by the manifold 44 moving over the fixed pistons 42 therein.

The bottom scarfing unit 27 also has means interconnecting it with the selector valve assembly 23 asociated with the top scarfing 22, so that horizontal movement of the bottom scarfing unit during sizing will produce a corresponding closing off of gas porting in the top scarfing unit. The preferred means for interconnecting the top and bottom units for accomplishing this consists of sizing cylinder 70 containing piston 71, piston rod 72 having its end opposite piston 71 connected to rod carrier 73, which in turn is fixedly attached to chain 74. Chain 74 is movable in mesh with sprocket 75, which in turn is connected to one end of telescoping spline shaft 76. The opposite end of spline shaft 76 is attached to another sprocket 77 which rotates with the spline shaft to cause movement of chain 78, rod carrier 79 attached thereto, and selector piston rods 68 fixedly attached to rod carrier 79. Through the above-described interconnecting means, horizontal movement of the bottom scarfing unit during sizing will be transmitted to produce a corresponding movement in the same direction of the gas selector pistons 45 into manifold 47, associated with the top scarfing unit.

Similarly, the top scarfing unit 22 has means for interconnecting it with the selector valve assembly 28 associated with the bottom scarfing unit 27, so that horizontal movement of the top scarfing unit during sizing will produce a corresponding closing off of gas porting in the bottom scarfing unit. The preferred interconnecting means consists of sizing cylinder 80 containing piston 81, piston rod 82, rod carrier 83 to which the end of piston rod 82 opposite piston 81 is attached, and chain 84 to which the rod carrier 83 is affixed.

Chain 74 is movable in mesh with sprocket 85 connected to one end of telescoping spline shaft 86. The opposite end of spline shaft 86 is attached to drive a sprocket 87 in mesh with chain 88 to which rod carrier 89 and selector piston rods 69 are connected. Through this interconnecting means, horizontal movement of the top scarfing unit during sizing will be transmitted to produce a corresponding movement in the same direction of the gas selector pistons 46 into manifold 48 associated with the top scarfing head, producing a progressive closing off of gas porting to such top unit.

In operation, before the master switch (not shown) is energized to begin the sizing operation about the workpiece W, the units are in a completely retracted position as shown in FIG. 1. In this position of the lower float member 15 is allowed to remain under its own weight in its lowest position. If desired however air pressure may be applied to ports 90 of air cylinders 19 so that the weight of the lower float member is only slightly greater than the upward forces created by such air pressure. This will enable the machine to size more rapidly and have increased responsiveness to reasonably small changes in air pressure. The upper float member 14 is maintained in its retracted "up" position by applying air pressure through ports 91 of air cylinders 18. The side scarfing units 24 and 32 respectively are maintained in a stopped "out" position during retraction by air pressure applied through ports 92 and 93 of respective air cylinders 36 and 40.

To remove most of the loading upon the gears 56 and 66 and their respective racks 57 and 67, the right side vertical slide 31 is maintained in its upward position during retraction by a helper air cylinder 95 supported by horizontal slide plate 34, as shown more clearly in FIG. 4. The air pressure supplied through port 96 is sufficient to counterbalance the weight of the vertical slide 31, including the weight of the scarfing unit and selector valve assembly carried thereby. Although the left side vertical slide 26 is allowed to remain in its lowest vertical position with respect to the upper float member 14 during retraction, the weight of such slide 26 is at least partially offset by air pressure applied through port 98 to helper air cylinder 97. Thus although the weight of the various machine components is considerable, the machine will be quick acting and respond easily to movements transmitted through the above-described gearing means. Although dirt which normally enters the various air cylinders over a normal period of operation in a steel mill will affect the performance of such air cylinders, the mechanical gearing means enumerated will allow the machine to operate in a satisfactory manner over a greater period of time without necessitating air pressure changes thereto. This is an important advantage because such changes in air pressure must be determined empirically in the mill to overcome the effects of the dirt which has entered the various air cylinders.

The scarfing cycle begins with the scarfing units in completely retracted position. As soon as a rectangular metal body W, e.g. a steel slab, of any size cross-section smaller than the maximum size which the machine can handle, enters the mouth of the machine, all phases of the scarfing cycle are initiated by the closing of a master switch (not shown) which energizes the necessary air regulation equipment to supply air pressure to the air cylinder ports, as will be explained hereinafter.

Air pressure is supplied to ports 90 of air cylinders 19, which raises the lower float member 15 until the scarfing unit 27 contacts the bottom surface of the workpiece W. In so doing, the sizing cylinder 50 moves upwardly around its piston 51 until the piston is in contact with the bottom of such cylinder. At this point the forward face of bottom scarfing unit 27 has moved to the position shown in FIG. 3 wherein the unit is in position to scarf the maximum size workpiece; the gas selector pistons within manifold 48 are in a "wide open" position. Referring further to FIG. 3, further upward movement of the sizing cylinder 50 with the lower float member 15, is transmitted to piston rod 52, which in turn causes the rack 53 to move upwardly. This upward movement of rack 53 produces a corresponding rotational movement of gear 54 which is transmitted through the telescoping spline shaft 55 to produce a corresponding rotational movement of gear 56. The rotation of gear 56 produces an upward movement of rack 57 and vertical slide plate 26 to which the rack 57 is fastened. This in turn produces an upward movement of left side scarfing unit 24 and manifold 43, causing a corresponding closing off of gas outlet ports in the manifold by pistons 41. In this manner, the bottom edge of left side scarfing unit 24 will always be clear of the forward face of bottom scarfing unit 27.

In like manner, air pressure is reduced to ports 91 of air cylinders 18 to allow the upper float member 14 and top scarfing unit 22 mounted thereon to move downwardly until the top scarfing unit 22 contacts the top surface of the slab W. In so doing, the sizing cylinder 60 moves downwardly around its piston 61 until the piston is in contact with the top of such cylinder. At this point the top scarfing unit will be in the position shown in FIG. 3, wherein the unit is capable of scarfing the entire width of the widest slab the machine is designed to accommodate; the gas selector pistons 45 within manifold 47 are in a "wide-open" position. Further downward movement of the top scarfing unit 22 into contact with the top surface of the slab W is transmitted to piston rod 62, which in turn causes the rack 63 to move downwardly. This downward movement of rack 63 produces a corresponding rotational movement of gear 64, which is transmitted through telescoping spline shaft 65 to produce a corresponding rotational movement of gear 66. The rotation of gear 66 produces a downward movement of rack 67 and vertical slide plate 31 to which the rack 67 is fastened. This in turn produces a downward movement of right side scarfing unit 32 and manifold 44 causing a corresponding closing off of gas outlet ports in the manifold by pistons 42. In this manner the top edge of right side scarfing unit 32 will always be clear of the forward face of top scarfing unit 22.

At about the same time that the upper and lower float members are being moved vertically toward one another, bringing the top and bottom scarfing units 22 and 27 respectively into contact with the slab W, air pressure is applied to air cylinders 40 and 36 respectively through respective ports 100 and 101, causing the scarfing units 32 and 24 respectively to move horizontally in opposite directions to one another, into contact with the sides of slab W. As aforementioned, the left side scarfing unit 24 is indirectly mounted through plate 26, to horizontal slide plate 30. In like manner, the right side scarfing unit is indirectly mounted through plate 31 to horizontal slide plate 34. When air pressure is applied through port 101 of air cylinder 36, it causes the entire horizontal slide plate 30 to slide to the right until the left side scarfing unit 24 contacts the side of the slab W. This movement occurs because the piston rod 37 is fastened at 38 to the upper float member 14. Similarly, air pressure applied through port 100 of air cylinder 40 causes the entire horizontal slide plate 34 to move to the left until the right side scarfing unit 32 contacts the side of slab W. As the scarfing units 24 and 32 move forward with one another the spline shafts 55 and 65 telescope inwardly.

As the right side scarfing unit 32 moves horizontally forward the slab W, the sizing cylinder 70 moves horizontally to the left therewith until its right end contacts the piston 71 therein. At this point, the right side scarfing unit will have taken the position shown in FIG. 3 wherein the unit will be in position to scarf the largest size slab for which the given machine is designed to scarf. At this point the gas selector pistons 45 associated with the top scarfing unit 22 will be in a "wide-open" position. Further horizontal movement of the right side scarfing unit into contact with the slab W is transmitted through piston rod 72 and rod carrier 73 to horizontally move chain 74. The chain movement produces a corresponding rotational movement of sprockets 75 and 77 through telescoping spline shaft 76, which in turn will move the chain 78 and pistons 45 to progressively close off gas porting associated with the top scarfing unit 22.

In like manner, as the left side scarfing unit is moved horizontally toward the slab W, the sizing cylinder 80 moves horizontally therewith to the right until its left end contacts the piston 81 therein. At this point, the left side scarfing unit will have taken the position shown in FIG. 3 wherein the unit will be in position to scarf the largest size slab for which the given machine is designed to scarf. The gas selector pistons 46 associated with the bottom scarfing unit 27 will, at this point, be in a "wide-open" position. Further horizontal movement of the left side scarfing unit into contact with the slab W is transmitted through piston rod 82 and rod carrier 83 to horizontally move chain 84. The chain movement produces a corresponding rotational movement of sprockets 85 and 87 through telescoping spline shaft 86, which in turn will move the chain 88 and pistons 46 to progressively close off gas porting associated with the bottom scarvng unit 27.

The spline shafts 76 and 86 are made telescoping such that they telescope inwardly as the top and bottom scarfing units move vertically toward one another into contact with the slab W.

The final position of each scarfing unit with its associated gas selector pistons when such units are completely closed about the slab W is shown in FIG. 5. It will be noted that the units form an overlapping type of relationship when fully closed, with the gas selector pistons partially closed off so as to provide the working surface of each unit with adequate gas flow.

At the end of each scarfing cycle, when a given slab has been scarfed, the operator opens the main scarf switch (not shown) and the units retract to the fully retracted position shown in FIG. 1. By appropriate gas valving in the control system, the opening of the main scarf switch causes pressure to be bled out of ports 90 in air cylinders 19. This causes the lower float member 15, upon which bottom scarfing unit 27 is indirectly mounted, to lower itself to the position shown in FIG. 1. At about the same time, a higher air pressure is applied to air cylinders 18, through ports 91, causing the upper float member 14, upon which top scarfing 22 is indirectly mounted, to be raised to the fully retracted position shown in FIG. 1. The side scarfing units also move to the completely retracted position shown in FIG. 1, upon the opening of the main scarf switch; air pressure is applied to air cylinders 36 and 40 through respective ports 92 and 93, which move horizontal slide plates 30 and 34 respectively to the FIG. 1 position.

The actual process gases utilized during scarfing may be turned on automatically by a timer electrically in parallel with the main scarf switch such that the scarfing process may be initiated a predetermined time after the scarfing have closed about the slab W. Through appropriate gas valving electrical circuitry, the process gases may be completely shut off upon the opening of the main scarf switch.

It is important that the top and bottom scarfing units move toward the workpiece in alignment such that the working surfaces of each unit remain parallel to the top and bottom surfaces thereof. Because the great weights and lengths of the float members to which these units are mounted can easily effect a misalignment, separate means for maintaining the units in alignment have been provided. As shown in FIG. 2, the upper float member 14 and lower float member 15 have a shaft 110 and 112 respectively associated with it. Each of these shafts is supported by pillow blocks 111 and 113 respectively, so as to be rotatable therein. The pillow blocks are mounted from the rear of columns K. Racks 114 and 115 are respectively mounted to the back of upper float member 14 and 15 respectively, adjacent the ends thereof. A pinion rotatably mounted on the ends of the shafts 110 and 112 have their teeth in meshed relationship with respective racks 114 and 115, so that as each float member moves vertically the respective racks move therewith vertically but are prevented from moving out of alignment parallel to the top and bottom surfaces of the workpiece by the pinions on each end of the shafts 110 and 112 respectively.

As shown in FIGS. 1 and 3, the horizontal slide plate air cylinders 36 and 40 have a locking apparatus designated as 120 and 130 respectively associated therewith. Similarly each of the vertical air cylinders 18 and 19 have a locking apparatus 140 and 150 respectively associated therewith, of the same type. Each of these locking devices is utilized when it is desired to scarf the entire surface of a given workpiece having uniform end surfaces as for example, the uniform material produced by the steelmaking process known in the art as continuous casting. It is also desirable as will be explained hereinafter to utilize such locking apparatus as part of the normal sizing sequence described hereinbefore, even when scarfing material having irregular ends wherein the entire surface of the workpiece will not be scarfed.

The purpose of each of the locking devices above-mentioned and to be more particularly described hereinafter is to lock the piston rod of each air cylinder after the scarfing units have sized themselves about a given metal workpiece, so that such units will not continue to move toward one another when the workpiece is backed out of the machine. After such devices have been energized to lock, the air pressure to each air cylinder is changed so that the scarfing units will begin to move toward their normally retracted position. As such units are moving toward their retracted position, they are again locked after they have moved a pre-set distance from their position in riding contact with the workpiece, by such locking devices so that such units cannot continue to move to the fully retracted position. We have found that a pre-set distance of between ¼ inch and 1 inch is usually sufficient for locking the scarfing units in such partially retracted position during preheating. At this point, relative movement between the workpiece and the scarfing units is effected in directions opposite to normal relative movement during scarfing, until the scarfing units are positioned with respect to the workpiece such that when the preheating gases and scarfing oxygen are turned on they will strike the surface to be scarfed at points immediately adjacent the forward end of the workpiece. In other words, in machines of the general type wherein the scarfing units ordinarily remain stationary during scarfing and wherein the workpiece is moved past the scarfing units, the workpiece would be backed out of the machine to the correct preheating position. In machines of the general type wherein the workpiece remains stationary during scarfing while the scarfing units are moved from one end of the workpiece to the other, the scarfing units are backed up to the correct preheating position.

With the units locked in this partially retracted position, preheat flows of oxygen and fuel gas are initiated and ignited to form preheat flames directed against the surfaces to be scarfed at points immediately adjacent the forward end of the workpiece. The flames are continued in such partially retracted position until a thermochemical reaction takes place on said surfaces. Thereafter a sheet-like stream of scarfing oxygen is directed against said surfaces while producing continuing relative movement between the scarfing units and the workpiece in directions normally employed during scarfing. In machines of the stationary scarfing unit type, this is accomplished by moving the workpiece toward the scarfing units whereas in machines of the stationary workpiece type, the scarfing units are moved toward the workpiece.

As soon as the workpiece enters the mouth of the machine, the scarfing units are disengaged from their partially retracted locked position and are again moved into riding contact with the workpiece for scarfing the remainder thereof. This is accomplished by appropriate pressure changes to air cylinders 18, 19, 36 and 40.

Figure 6:
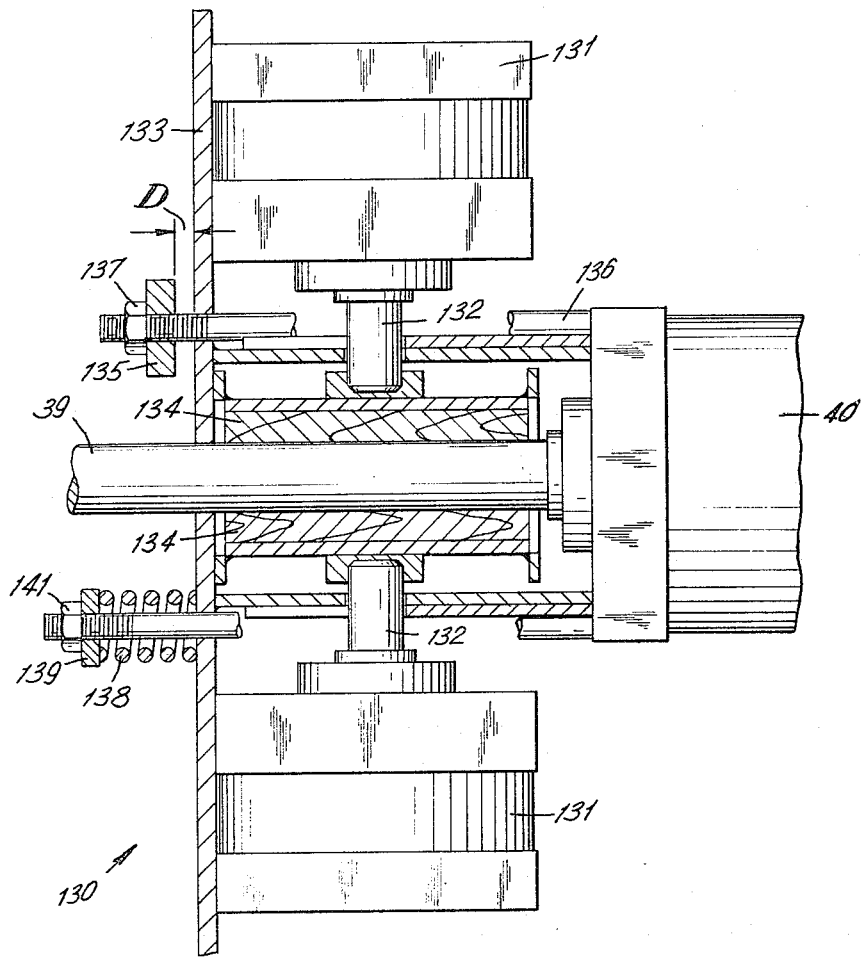
FIG. 6 is an enlarged sectional view of a locking apparatus shown in FIGS. 1 and 3, for use in scarfing the entire length of a workpiece.

Referring now to FIG. 6, a preferred locking apparatus for practicing the present invention is shown. The locking device illustrated is shown as it would be in association with horizontal slide plate air cylinder 40, since this is representative of the locking devices employed with air cylinders 36, 18 and 19. The locking device consists of a pair of coacting air cylinders 131 having respective piston rods 132. The air cylinders 131 are each firmly mounted from mounting plate 133. The piston rods 132 have a pair of complementary brake shoes 134 fastened thereto for frictionally engaging the piston rod 39 when the air cylinders 131 are activated. Wooden brake shoes have been found to be well suited for this application.

Before each locking device is actuated, the pistons 132 are withdrawn into each air cylinder 131 such that the brake shoes 134 are out of contact with piston rod 39. This allows the right side scarfing unit 32 to move freely toward either a completely closed or completely retracted position. When the locking device is energized, however, the pistons 132 move to bring the brake shoes against the piston rod 39 to forcibly prevent the cylinder 40 from moving over it, and thereby preventing the scarfing unit 32 from moving further toward a completely closed position. The metal body may then be backed out of riding contact with the four scarfing units if desired. To allow each scarfing unit to be partially retracted a predetermined distance D, an adjustable stop 135 on tie rods 136 is provided, the adjustment of which may be varied by adjusting nut 137. When pressure is applied to air cylinder 40 in order to partially retract the right side scarfing unit 32, the stop 135 moves with air cylinder 40 until it comes into bearing contact with plate 133, and thereby prevents the air cylinder 40 from retracting further toward a fully retracted position.

The pre-set distance D is maintained constant by the force of spring 138 compressed against plate 133 by stop 139 and nut 141.

After the scarfing reaction has been initiated adjacent the forward end of the workpiece and the locking device is ready to be disengaged, the pistons 132 and brake shoes 134 are retracted such that the entire locking device may move with the air cylinder 40 until the right side scarfing unit 32 once again comes into riding contact with the workpiece, for scarfing the remainder thereof.

In summary, the entire locking device 130 moves with air cylinder 40 during the normal sizing and retraction parts of the overall cycle, except for the brief period in which the brake shoes 134 engage the piston rod 39. Locking device 120 operates in the same manner in moving with air cylinder 36 only during the period in which it is not engaged. Locking devices 140 and 150 however do not move at all, since air cylinders 18 and 19 with which they are respectively associated are stationary. The brake shoes in each of these units corresponding with brake shoes 134 in locking device 130, prevent the piston rods 20 and 21 respectively from moving, when they engage such piston rods during the locking portion of the cycle described hereinbefore.

According to two other embodiments of this invention, the locking devices are utilized during the normal sizing cycle, regardless of whether or not it is desired to reverse the movement of the workpiece, i.e. back the workpiece out of the machine, for scarfing the entire surface length thereof.

One such embodiment consists in delaying the movement of the side scarfing units 24 and 32 in a horizontal direction until after the top and bottom scarfing units have contacted the slab and been locked and partially retracted therefrom. With the top and bottom scarfing units in partially retracted position, the necessary air pressures are supplied to air cylinders 36 and 40 to move the side scarfing units into contact with the slab and simultaneously shift the top and bottom scarfing units horizontally with respect to such slab. As soon as the side scarfing units have contacted the sides of the slab, the locking devices 140 and 150 are disengaged and the top and bottom scarfing units are moved into contact with the slab for the scarfing thereof. In this embodiment, the locking devices 120 and 130 need not be engaged unless it is desired to scarf the entire length of the slab as aforedescribed. The advantages gained by the use of this embodiment are considered to be substantial, since the heavy top and bottom scarfing units may be moved horizontally during sizing, without being dragged across the surface of the slab. Unscarfed steel bodies usually have rough and uneven surfaces encrusted with oxides, over which the top and bottom scarfing units are normally dragged. This is one of the main reasons for scarfing unit wear and a major maintenance problem.

The uneven rough surfaces also prevent the top and bottom units from moving smoothly, i.e., at a substantially constant speed. Instead, a scarfing unit may become hung up on a rough spot until additional air pressure is applied to the air cylinder supplying the motive force. When sufficient force is produced to overcome the drag force, the scarfing unit will surge forward, often causing the side scarfing unit which moves therewith to slam against the side of the steel workpiece, creating increased wear to that unit as well. Moreover, the pressures must thereafter be readjusted to their previous optimum settings. The present embodiment overcomes these difficulties and is more conducive to an automated self-sizing scarfing process because the heavy top and bottom scarfing units are not in contact with the slab surface when they are being moved horizontally.

If it is desired to scarf the entire surface length of the slab as previously described, the locking devices 120 and 130 could be energized and the side scarfing units partially retracted before the locking units 140 and 150 are disengaged, and the workpiece thereafter backed out of the machine as aforedescribed for initiating the scarfing reaction adjacent the end of the slab. Thereafter the locking devices would all be disengaged and the scarfing units moved back into riding contact with the slab as aforedescribed.

The second embodiment referred to consists in locking all of the locking devices and partially retracting all of the scarfing units during the normal preheating period in cases wherein it is not desired to scarf the entire length of a given slab, as for example, when the slab has irregular ends which will be severed and discarded at a later step in the rolling process. According to this embodiment, the scarfing reaction is actually begun while all of the scarfing units are just out of contact with the surfaces of the slab and are not moved into riding contact therewith until the slab has already started to move past the scarfing units. The advantage derived from this mode of operation is that it eliminates all the drag forces normally imposed upon the mill roll table drive system by the scarfing units at a time when such system must overcome the initially high starting load imposed upon it in bringing the heavy slab up to speed from its stopped position during the preheating period. This constitutes an obviously important benefit to the steel mill operator.

Although preferred embodiments of this invention have been described in detail, it will be appreciated that modifications may be made and that some parts may be used without others, all within the contemplation and spirit of the invention.

For example, the top scarfing unit and the right side scarfing unit could have been mounted upon the upper float member while the bottom and left side scarfing units were mounted upon the lower float member by obvious modification to the gearing system disclosed. The method and apparatus for scarfing the entire surface length of a given workpiece may be used with scarfing machines of different design than the specific machine herein disclosed. The sizing embodiments disclosed wherein the top and bottom scarfing units are not dragged across the surface of the workpiece during sizing, as well as the embodiment wherein all of the scarfing units are out of contact with the workpiece during the preheating period can also be used with many machines of varying basic design. The scarfing units employed, while preferably of the post mixed type, may also be of the pre-mixed type.

We claim:

1. Method for thermochemically scarfing a rectangular metal workpiece which comprises providing upper, lower, left side and right side scarfing units, each being movable toward and retractable away from the respective surface to be scarfed thereby; moving the upper and lower scarfing units into contact with the upper and lower surfaces respectively of the workpieces; retracting said upper and lower units a pre-set distance normal to the surface to be scarfed thereby and maintaining them in such retracted position; moving the side scarfing units into contact with the respective sides of the workpiece while simultaneously horizontally shifting the upper and lower scarfing units in response to the movement of the side units until the side units contact the respective surfaces of the workpiece; thereafter moving said upper and lower scarfing units from their pre-set retracted position into riding contact with the workpiece, and thereafter scarfing the workpiece in a conventional manner.

2. Method as claimed in claim 1 wherein the upper and lower scarfing units are first locked after initially contacting the upper and lower surfaces respectively of the workpiece, prior to their being retracted as set forth.

3. Method for thermochemically scarfing substantially the entire length of a metal workpiece which comprises providing a scarfing unit for each surface thereof to be scarfed, each unit being movable toward and retractable away from said surface in a direction substantially normal thereto; moving each of said scarfing units toward said workpiece until it contacts the respective surface thereof; locking said units in such contacted position; moving the workpiece in a direction opposite to its normal travel during scarfing to a position wherein the preheating gases and scarfing oxygen streams when turned on will strike the surface to be scarfed immediately adjacent the forward end of the workpiece; initiating preheat flows of oxygen and fuel gas and igniting same to form preheat flames directed against the surfaces to be scarfed at points immediately adjacent the forwarfd end of said workpiece to preheat said surfaces and start a thermochemical reaction thereon, thereafter directing a sheet-like stream of scarfing oxygen against said preheated surface while moving said workpiece toward said scarfing units at a normal scarfing speed; and disengaging said scarfing units from their locked position for scarfing the remainder of said workpiece while in riding contact therewith.

4. Method for thermochemically scarfing substantially the entire length of a metal workpiece which comprises providing a scarfing unit for each surface thereof to be scarfed, each unit being movable toward and retractable away from said surface in a direction substantially normal thereto; moving each of said scarfing units toward said workpiece until it contacts the respective surface thereof; locking said units against further forward movement when the workpiece is moved away therefrom in a direction opposite to its normal travel during scarfing; partially retracting each of said units to a position just out of contact with said workpiece and maintaining them in said partially retracted position; moving the workpiece in a direction opposite to its normal travel during scarfing to a position wherein the preheating gases and scarfing oxygen streams when turned on will strike the surfaces to be scarfed at points immediately adjacent the forward end of said workpiece; initiating preheat flows of oxygen and fuel gas and igniting same to form preheat flames directed against the surfaces to be scarfed at points immediately adjacent the forward end of said workpiece to preheat said surfaces and start a thermochemical reaction thereon, thereafter directing a sheet-like stream of scarfing oxygen against said preheated surfaces while moving said workpiece toward said scarfing units at normal scarfing speed, and disengaging said scarfing units from their locked partially retracted position and moving them into riding contact with said workpiece for scarfing the remainder thereof.

5. Method of thermochemically scarfing according to claim 4 wherein said partially retracted position of each of said scarfing units is less than one inch from its previous position in contact with the workpiece.

6. Method for thermochemically scarfing substantially the entire length of a metal workpiece which comprises providing a scarfing unit for each surface thereof to be scarfed, each unit being movable toward and retractable away from said surface in a direction substantially normal thereto; moving each of said scarfing units toward said workpiece until it contacts the respective surface thereof; locking said units against further forward movement when relative movement between said scarfing units and said workpiece in directions opposite to normal relative movement therebetween during scarfing is produced; partially retracting each of said units to a position just out of contact with said workpiece and maintaining them in said partially retracted position; producing relative movement between said scarfing units and said workpiece in directions opposite to normal relative movement during scarfing until the scarfing units are positioned with respect to the workpiece such that when the preheating gases and scarfing oxygen are turned on they will strike the surfaces to be scarfed at points immediately adjacent the forward end of the workpiece; initiating preheat flows of oxygen and fuel gas and igniting same to form preheat flames directed against the surfaces to be scarfed at points immediately adjacent the forward end of said workpiece to preheat said surfaces and start a thermochemical reaction thereon, thereafter directing a sheet-like stream of scarfing oxygen against said preheated surfaces while producing continuing relative movement between said scarfing units and said workpiece in directions normal during scarfing; and disengaging said scarfing units from their locked partially retracted position and moving them into riding contact with said workpiece for scarfing the remainder thereof.

No references cited.

DAVID L. RECK, *Primary Examiner.*

W. W. STALLARD, *Assistant Examiner.*

UNITED STATES PATENT OFFICE
CERTIFICATE OF CORRECTION

Patent No. 3,395,054                                                  July 30, 1968

Alfred J. Miller et al.

It is certified that error appears in the above identified patent and that said Letters Patent are hereby corrected as shown below:

Column 2, line 68, "self-szing" should read -- self-sizing --. Column 3, line 53, "horiozntal" should read -- horizontal --. Column 4, line 1, "substantailly" should read -- substantially --; line 43, after "of" insert -- the --. Column 5, line 35, "is" should read -- in --. Column 6, line 9, "72" should read -- 27 --; line 22, after "gearing" insert -- the -- line 40, "or" should read -- of --. Column 7, line 11, "74" should read -- 84 --; line 25, cancel "of". Column 9, line 34, "scarvng" should read -- scarfing --. Column 12, line 57, "discarbed" should read -- discarded --. Column 13, line 24, "workpieces" should read -- workpiece --; line 20, after "each" insert -- unit --; line 55, "forwarfd" should read -- forward --

Signed and sealed this 10th day of March 1970.

(SEAL)
Attest:

EDWARD M. FLETCHER, JR.                              WILLIAM E. SCHUYLER, JR.
Attesting Officer                                           Commissioner of Patents